Dec. 2, 1924.

G. LOVELL

REFLECTOR

Filed Aug. 19, 1921

1,517,563

G. Lovell,
INVENTOR by R. Foster,
Attorney.

Patented Dec. 2, 1924.

1,517,563

UNITED STATES PATENT OFFICE.

GEORGE LOVELL, OF STRATFORD, LONDON, ENGLAND.

REFLECTOR.

Application filed August 19, 1921. Serial No. 493,594.

(GRANTED UNDER THE PROVISIONS OF THE ACT OF MARCH 3, 1921, 41 STAT. L., 1313.)

*To all whom it may concern:*

Be it known that GEORGE LOVELL, a subject of the King of England, residing at 10 Marshgate Lane, Stratford, London, E. 15, England, has invented certain new and useful Improvements in Reflectors, and for which a patent was obtained in Great Britain on Mar. 4, 1919, No. 142,961, accepted May 20, 1920, of which the following is a specification.

The present invention relates to silvered glass reflectors for the reflection of artificial light, more particularly to reflectors used for taking kinematographic pictures and photography in general. The object of the invention is to construct the reflectors in such a manner as to provide the greatest possible evenness of intensity of illumination and also to avoid strongly outlined and dark shadows.

According to the invention this evenness of illumination is obtained by making the surface of the reflector either on one side or on both sides undulating in all directions so that the surface is impressed with hollows and projections of exceedingly slight depths and heights and without sharp dividing ridges between them. The small areas between the hollows form a large number of separate reflectors and produce a dispersion of light and an evenness of illumination and a softened outline of shadows with only slight loss of light.

The invention is applicable both to curved and flat reflectors.

For the purposes of the invention figured rolled or cast glass of a particular type known in the trade as "hammered cast cathedral" and "hammered rolled cathedral" may be used, as such glass is provided in the course of its manufacture when in a molten or semi-molten condition with very shallow depressions and very slight projections. Other well known varieties of figured rolled or cast glass are as a rule quite unsuitable as they show pronounced ridges. The lens like formations of the commercial hammered glasses have a fire polished surface whilst the plain side is more or less rough. This plain side may be surface ground and polished in order to give increased reflection and avoid absorption and scattering of light.

Instead of using commercial glass of the type mentioned above, the required formation of the surface may be produced by bending, pressing or blowing the glass into the required reflector shape in a mould provided with the required hollows and projections.

The reflector may be silvered either upon the plain or upon the figured surface, that is the figured surface may be either the exterior or the interior surface.

Figure 1:
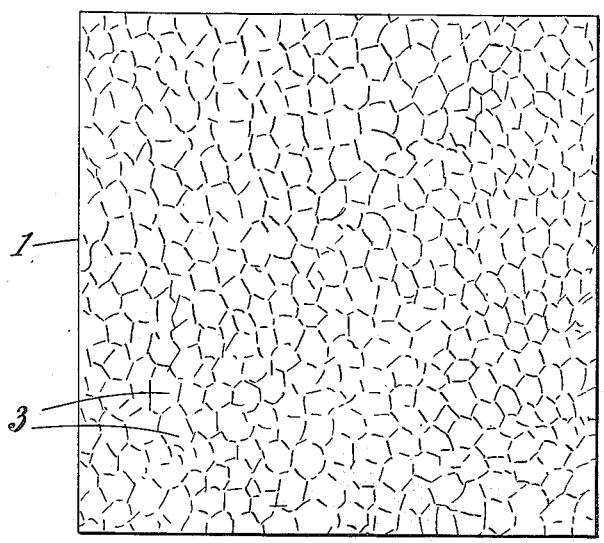
Figure 2:
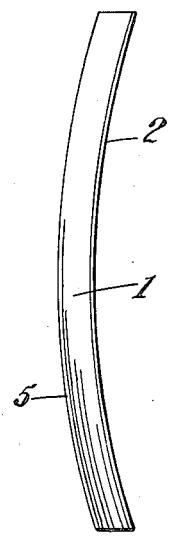
Figure 3:
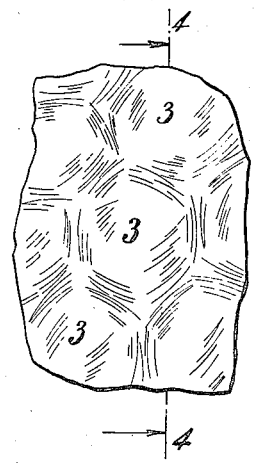
Figure 4:
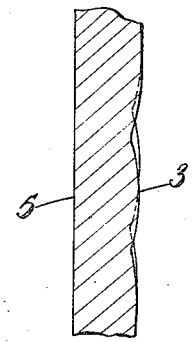

The accompanying drawings show by way of example a rectangular reflector for taking kinematographic pictures. Fig. 1 is a front elevation, Fig. 2 is an end view. Fig. 3 a detailed view drawn to a larger scale showing the undulations and Fig. 4 a section on line 4—4 of Fig. 3.

The reflector 1 is of rectangular shape and has the curvature shown in Fig. 2. It is provided on its front concave surface 2 with a large number of lens like convex projections 3 of very small height. The rear convex surface 5 of the reflector is silvered and varnished as usual.

I claim:

1. A reflector for the reflection of artificial light, more particularly for taking kinematographic pictures and photography, comprising a transparent sheet having an undulating surface formed with irregular hollows and projections of exceedingly slight depths and heights without sharp dividing ridges between them, and having a reflecting coating in its rear side.

2. A reflector comprising a glass sheet having an undulating surface made up of slight and generally convex projections separated by depressions without lines of demarkation, and having its rear side provided with a reflecting surface.

3. A silvered glass reflector for the reflection of artificial light more particularly for taking kinematographic pictures and photography, comprising a transparent sheet in which one surface of the reflector is formed with irregular hollows and projections of exceedingly slight depths and generally convex heights without sharp dividing ridges or lines between them, said surface being fire polished, the opposite surface is surface ground and polished.

In testimony whereof he has hereunto set his hand in the presence of two witnesses.

GEORGE LOVELL.

Witnesses:
R. R. WATERS,
E. F. CORKER.